(12) United States Patent
Mak et al.

(10) Patent No.: US 7,508,617 B1
(45) Date of Patent: Mar. 24, 2009

(54) FLY HEIGHT COMPENSATION USING READ GAIN CONTROL LOOP

(75) Inventors: HonYeong Mak, Singapore (SG); LinNah Lim, Singapore (SG); DetHau Wu, Singapore (SG); Edmun ChianSong Seng, Singapore (SG); UttHeng Kan, Singapore (SG)

(73) Assignee: Seagate Technology LLC, Scotts Valley, CA (US)

( * ) Notice: Subject to any disclaimer, the term of this patent is extended or adjusted under 35 U.S.C. 154(b) by 0 days.

(21) Appl. No.: 11/851,534

(22) Filed: Sep. 7, 2007

(51) Int. Cl.
G11B 21/02 (2006.01)
G11B 5/02 (2006.01)

(52) U.S. Cl. .......................... 360/75; 360/67

(58) Field of Classification Search ................. None
See application file for complete search history.

(56) References Cited

U.S. PATENT DOCUMENTS

| | | | |
|---|---|---|---|
| 5,377,058 A | 12/1994 | Good et al. | |
| 5,412,346 A | 5/1995 | Burger, Jr. et al. | |
| 5,831,781 A | 11/1998 | Okamura | |
| 5,991,113 A * | 11/1999 | Meyer et al. | ................. 360/75 |
| 6,282,038 B1 | 8/2001 | Bonaccio et al. | |
| 6,671,110 B2 | 12/2003 | Baba et al. | |
| 6,671,111 B2 | 12/2003 | Ottesen et al. | |
| 6,883,368 B2 | 4/2005 | Smith et al. | |
| 6,950,266 B1 | 9/2005 | McCaslin et al. | |
| 6,968,731 B2 | 11/2005 | Hu et al. | |

* cited by examiner

*Primary Examiner*—K. Wong
(74) *Attorney, Agent, or Firm*—Myers Bigel Sibley & Sajovec, P.A.

(57) ABSTRACT

Apparatus and methods are disclosed that regulate head fly height so as to compensate for variation in height of a disk surface. An exemplary apparatus includes a circuit that detects disk height variation in response to variation in the gain of a variable gain amplifier, within an automatic gain control loop, that amplifies a read signal as the head reads from the disk surface. The circuit regulates the head fly height so as to compensate for the detected variation in disk height.

19 Claims, 7 Drawing Sheets

VGAS and BER of track with Clamping Distortion. ( No WBAFH )

Clearance to VGAS mapping

VGAS to Read Heater Characterization at Wedge (0, 50, 100, 150)

Calculated Heater Compensation

Read VGAS with and without WBAFH

FLY HEIGHT COMPENSATION USING READ GAIN CONTROL LOOP

BACKGROUND

The present invention generally relates to sensor clearance control and, more particularly, to controlling fly height of a read/write head in a data storage device.

Data storage devices, such as disk drives, allow host computers to store and retrieve large amounts of digital data in a fast and efficient manner. A typical disk drive includes a plurality of magnetic recording disks which are mounted to a rotatable hub of a spindle motor and rotated at a high speed. An array of read/write heads is disposed adjacent to data storage surfaces of the disks to transfer data between the disks and a host computer. The heads can be radially positioned over the disks by a rotary actuator and a closed loop servo system, and can fly in close proximity to the surfaces of the disks upon air bearings. The heads each typically contain a separate read element and write element.

Higher data storage density on the disks may be obtained by reading and writing data on narrower tracks on the disks and by maintaining a corresponding smaller fly height gap between the heads and the data storage surfaces. The fly height of a head can vary in response to air density changes in the disk drive, and in response to head temperature variations, such as while writing, which can affect the distance that the tip of the head protrudes therefrom (i.e., pole-tip protrusion). Some disk drives use a heater to controllably heat the head in order to vary the fly height of the head. Some disk drives attempt to maintain the head fly height in the nanometer scale.

Maintaining the head fly height within an acceptable range is becoming increasingly difficult as that range is reduced to obtain higher data storage densities. Operation outside the acceptable range may result in an unacceptable read/write bit error rate and/or undesirable contact between a head and a data storage surface and potential loss of data and/or damage to the data storage surface.

SUMMARY

The fly height of a head is regulated to compensate for variation in height of a disk surface.

In an exemplary apparatus, a circuit detects disk height variation in response to variation in the gain of a variable gain amplifier, within an automatic gain control loop, that amplifies a read signal as the head reads from the disk surface. The circuit regulates the head fly height so as to compensate for the detected variation in disk height In another exemplary apparatus, a circuit regulates head fly height using disk height compensated heater element values to regulate heating of a heater element so as to compensate for variations in height of a disk surface.

In an exemplary method, a variable gain amplifier within an automatic gain control loop is used to amplify a read signal as a head reads from a surface of a disk. Variation in height of the disk surface is detected in response to variation in gain of the variable gain amplifier. The head fly height is regulated to compensate for the detected variation in disk surface height.

DETAILED DESCRIPTION

Specific exemplary embodiments of the invention now will be described with reference to the accompanying drawings. This invention may, however, be embodied in many different forms and should not be construed as limited to the embodiments set forth herein; rather, these embodiments are provided so that this disclosure will be thorough and complete, and will convey the scope of the invention to those skilled in the art. The terminology used in the detailed description of the particular exemplary embodiments illustrated in the accompanying drawings is not intended to be limiting of the invention.

It will be understood that, as used herein, the term "comprising" or "comprises" is open-ended, and includes one or more stated elements, steps and/or functions without precluding one or more unstated elements, steps and/or functions. As used herein, the singular forms "a", "an" and "the" are intended to include the plural forms as well, unless the context clearly indicates otherwise. As used herein the terms "and/or" and "/" include any and all combinations of one or more of the associated listed items. It will be understood that, although the terms first, second, etc. may be used herein to describe various steps, elements and/or regions, these steps, elements and/or regions should not be limited by these terms. These terms are only used to distinguish one step/element/region from another step/element/region. Thus, a first step/element/region discussed below could be termed a second step/element/region without departing from the teachings. Like numbers refer to like elements throughout the description of the figures.

The present invention may be embodied in hardware and/or in software (including firmware, resident software, microcode, etc.). Consequently, as used herein, the term "signal" may take the form of a continuous waveform and/or discrete value(s), such as digital value(s) in a memory or register.

The present invention is described below with reference to block diagrams of disk drives, disks, controllers, and operations according to various embodiments. It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show what may be a primary direction of communication, it is to be understood that communication may occur in the opposite direction to the depicted arrows.

Figure 1:
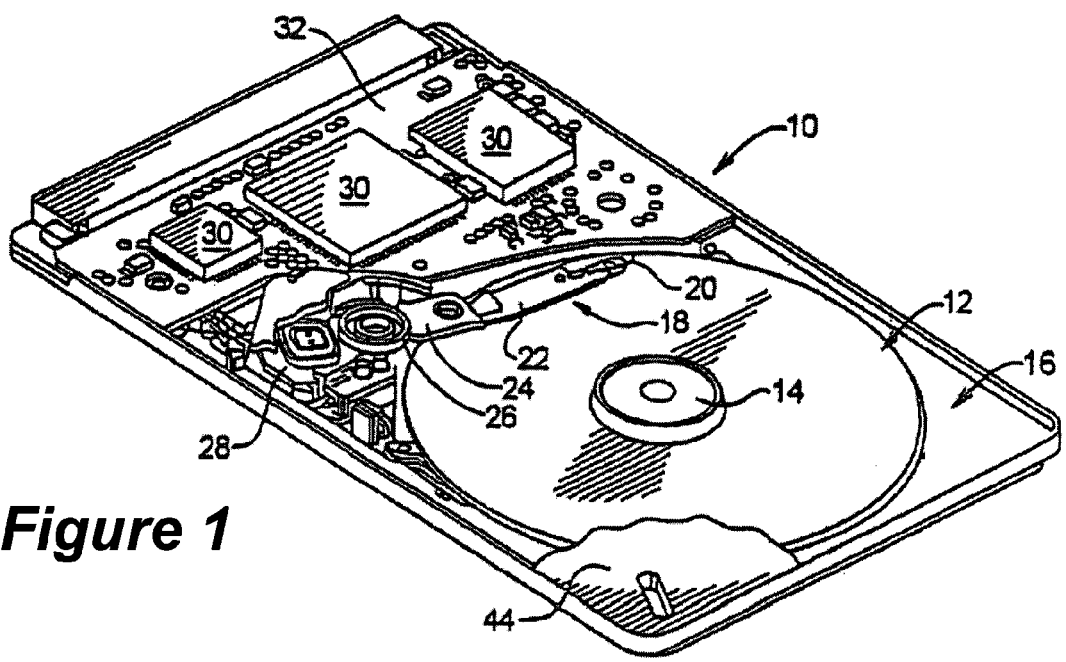
FIG. 1 is a perspective view of a disk drive with electronic circuits that are configured in accordance with some embodiments.
Figure 2:
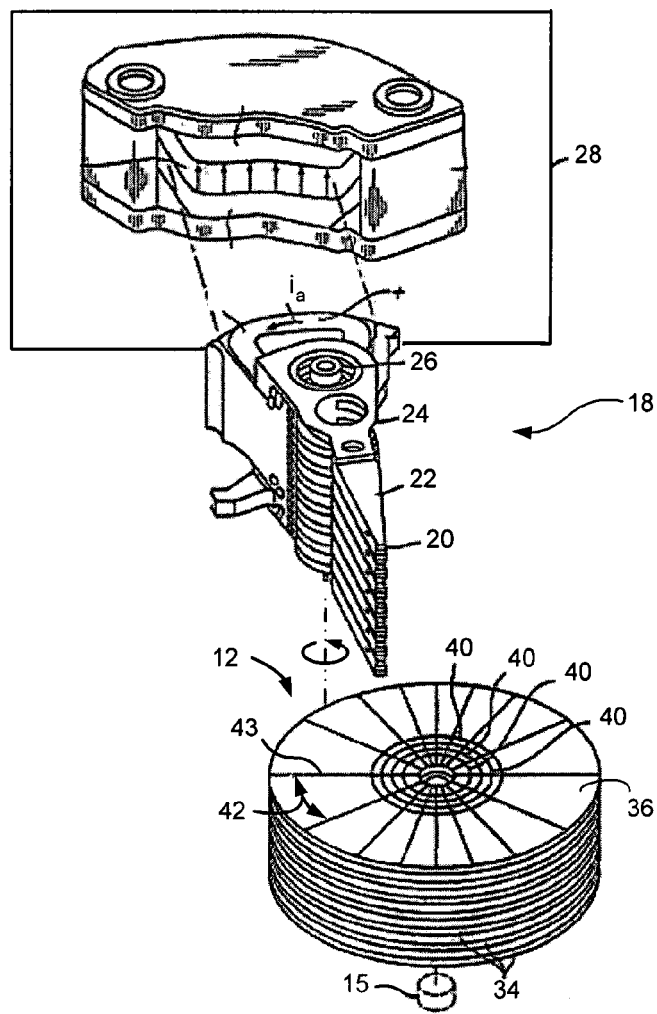
FIG. 2 is a block diagram of an exemplary head disk assembly of the disk drive.

A simplified diagrammatic representation of a disk drive, generally designated as 10, is illustrated in FIG. 1. The disk drive 10 includes a disk stack 12 (illustrated as a single disk in FIG. 1) that is rotated about a spindle 14 by a spindle motor 15 (FIG. 2). The spindle motor 15 is mounted to a base plate 16. An actuator arm assembly 18 is also mounted to the base plate 16. The disk drive 10 is configured to store and retrieve data responsive to write and read commands from a host device. A host device can include, but is not limited to, a desktop computer, a laptop computer, a personal digital assistant (PDA), a digital video recorder/player, a digital music recorder/player, and/or another electronic device that can be communicatively coupled to store and/or retrieve data in the disk drive 10.

The actuator arm assembly 18 includes a read/write head 20 (or transducer) mounted to a flexure arm 22 which is attached to an actuator arm 24 that can rotate about a pivot bearing assembly 26. The read/write head, or simply head, 20 may, for example, include a magnetoresistive (MR) element and/or a thin film inductive (TFI) element. The actuator arm assembly 18 also includes a voice coil motor (VCM) 28 which radially moves the head 20 across the disk stack 12. The spindle motor 15 and actuator arm assembly 18 are coupled to a controller, read/write channel circuits, and other associated electronic circuits 30 which are configured in accordance with at least one embodiment, and which can be enclosed within one or more integrated circuit packages mounted to a printed circuit board (PCB) 32. The controller, read/write channel circuits, and other associated electronic circuits 30 are referred to below as a "circuits" for brevity. The circuits 30 may include analog circuitry and/or digital circuitry, such as a gate array and/or may include instructions that are executed by one or more microprocessor-based instruction processing devices (e.g., general-purpose processor(s) and/or digital signal processor(s)).

Referring now to the illustration of FIG. 2, the disk stack 12 typically includes a plurality of disks 34, each of which may have a pair of disk surfaces 36. The disks 34 are mounted on a cylindrical shaft and are rotated about an axis by the spindle motor 15.

The actuator arm assembly 18 includes a plurality of the heads 20, each of which is positioned to be adjacent to a different one of the disk surfaces 36. Each head 20 is mounted to a corresponding one of the flexure arms 22. The VCM 28 operates to move the actuator arm 24, and thus moves the heads 20 across their respective disk surfaces 36. The heads 20 are configured to fly on an air cushion relative to the data recording surfaces 36 of the rotating disks 34 while writing data to the data recording surface responsive to a write command from a host device or while reading data from the data recording surface to generate a read signal responsive to a read command from the host device.

FIG. 2 further illustrates tracks 40 and spokes 43 on the disks 34. Data is stored on the disks 34 within a number of concentric tracks 40 (or cylinders). Each track 40 is divided into a plurality of radially extending wedges 42 separated by radially extending spokes 43. Each wedge is further divided into a servo wedge and a data wedge. The servo wedges of the disks 34 are used, among other things, to accurately position the head 20 so that data can be properly written onto and read from a selected one of the disks 34. The servo wedges may include a DC erase field, a preamble field, a servo address mark field, a track number field, a spoke number field, and a servo burst field (e.g., circumferentially staggered and radially offset A, B, C, D servo bursts). The data wedges are where data received as part of a host-initiated write command is stored, and where data can be read in response to a host-initiated read command.

Some embodiments of the present invention are directed to compensating for warping that can occur on the disk surfaces 36 due to, for example, the use of disk clamps to secure the disks 34 to the spindle 14. Such disk clamps can exert forces on the disks 12 that warp (bend) the disk surfaces 36. The inner diameter region of the disks 12 closest to the spindle 14 and disk clamp can experience the greatest amplitude of disk warping and, consequently, the greatest head-to-disk fly height variation. Clamping induced disk warping may be most severe in small form factor disk drives, e.g. less than 1.8" diameter disks, due to, for example, use of maximum areal data density on the disk surface and the relatively large tract area of the disk that can be affected by the disk warping.

Figure 3:
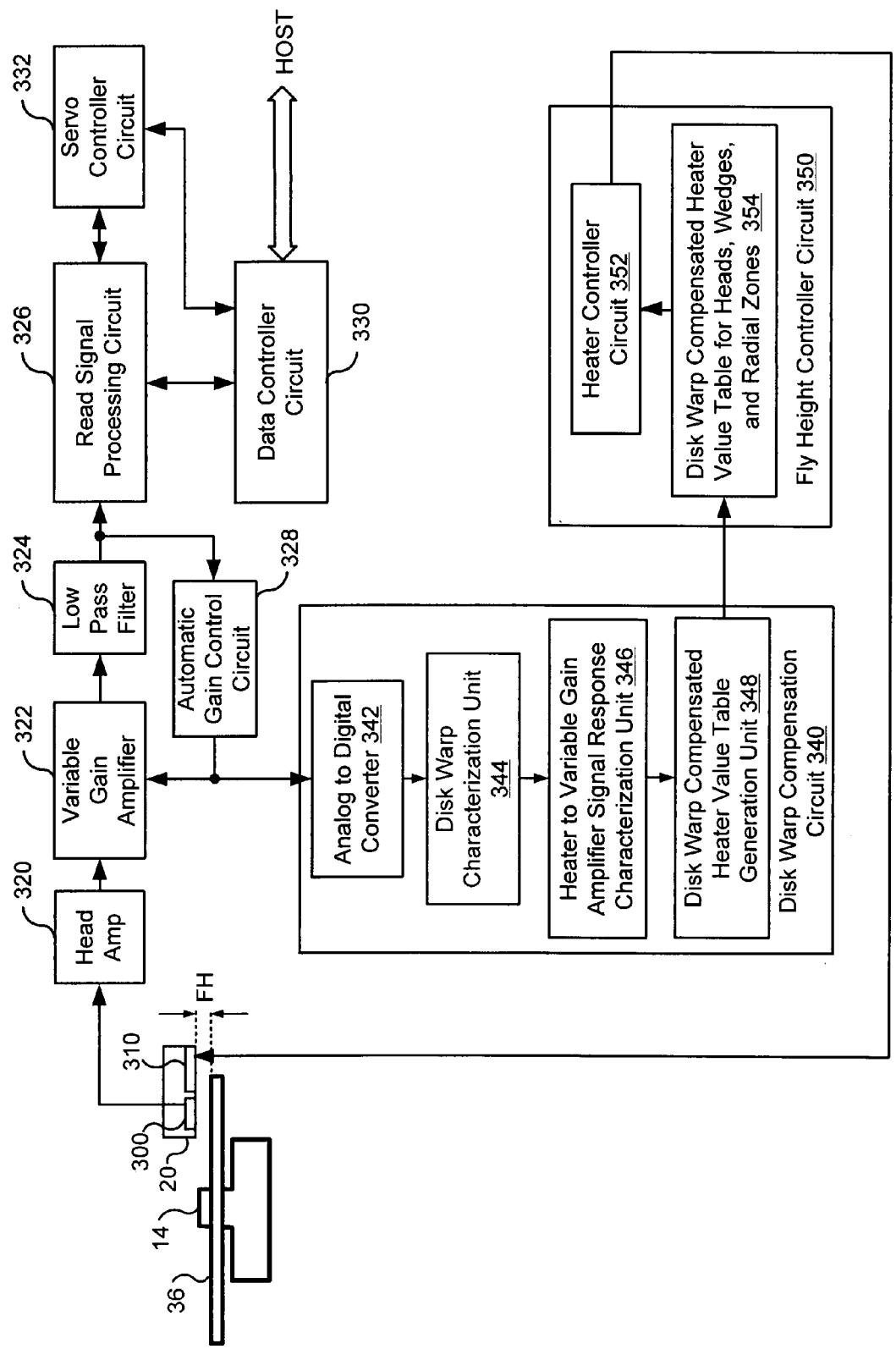
FIG. 3 is a block diagram of a portion of the electronic circuits of the disk drive shown in FIG. 1 that are configured in accordance with some embodiments.

FIG. 3 is a block diagram of a portion of the electronic circuits of the disk drive shown in FIG. 1 that are configured to characterize and compensate for disk warping. Referring to FIG. 3, the exemplary head 20 is illustrated with a fly height (FH) relative to the disk surface 36 which is rotated about the spindle 14. The head 20 includes a read/write element 300 (e.g., magnetoresistive (MR) element and/or a thin film inductive (TFI) element) and a heater element 310. A read signal is generated as the read/write element 300 reads from the disk surface 36. The read signal is initially amplified by a head amplifier 320, and is then further amplified by a variable gain amplifier 322, filtered by a low pass filter 324, and provided to read signal processing circuit 326. The read signal processing circuit 326 may operate in a conventional manner to detect data in the amplified and filtered read signal, and can provide a detected sequence of logical ones and zeros to the data controller 52. The data controller 330 can decode the data and format the data for communication to a host device. A host device can include, but is not limited to, a desktop computer, a laptop computer, a personal digital assistant (PDA), a digital video recorder/player, a digital music recorder/player, and/or another electronic device that can be communicatively coupled to store and/or retrieve data in the disk drive 10.

The read signal processing circuit 326 and/or the data controller 330 can provide servo positional information read from the disk surface 36 to a servo controller 332. The servo positional information can be used to detect the location of the head 20 in relation to logical block addresses (LBAs) on the disk surface 36. The servo controller 332 can use the servo positional information to seek the head 20 to an addressed track and block on the disk surface 36, and to maintain the head 20 aligned with the track while data is written/read on the disk surface 36.

The gain of the variable gain amplifier 322 is regulated by a signal, referred to as a variable gain amplifier gain signal (VGAS), generated by an automatic gain control circuit 328 that responds to the filtered read signal from the low pass filter 324. The automatic gain control circuit 328, the variable gain amplifier 322, and the low pass filter 324 may form an automatic gain control loop that varies the gain of the variable gain amplifier 322, via the VGAS, in an attempt to maintain a relatively constant read signal amplitude that is provided to the read signal processing circuit 326 irrespective of variations in the strength of the magnetic transitions on the disk surface 36 and variations in the head fly height FH. The automatic gain control loop may vary the VGAS in response to a defined pattern in a servo wedge, such as a gain control pattern defined therein.

As explained above, warping of the disk surface 36 causes variation in the head fly height FH as the disk reads from tracks. If the head fly height FH is not regulated to compensate for the warped disk surface 36, the resulting variation in the read signal amplitude may result in excessive variation in the gain of the variable gain amplifier 322 and unacceptable decrease in the signal to noise ratio (SNR) in the amplified read signal. Decreased read signal SNR may constrain the data storage density that can be reliably achieved on the disk surface 36.

In accordance with some embodiments, a disk warp compensation circuit 340 is provided that characterizes the extent of the warping of the disk surface 36 and generates a table of heater values that are adjusted to compensate for the characteristics of the warped disk surface 36. A fly height controller circuit 350 uses the disk warp compensated heater value table to regulate the head fly height FH as the head 20 moves through sectors and radial zones on the disk surface 36 and experiences corresponding changes in the height of the disk surface 36 due to warping.

The disk warp compensation circuit 340 may include an analog-to-digital (A/D) converter 342, a disk warp characterization unit 344, a heater to VGAS response characterization unit 346, and a disk warp compensated heater value table generation unit 348. The A/D converter 342 converts the analog VGAS from the automatic gain control circuit 328, which controls the gain of the variable gain amplifier 322, into a digital VGAS. The disk warp characterization unit 344 determines the warp profile across the wedges of the disk surface 36 based on the profile of the digital VGAS. The disk warp characterization unit 344 may further determine the warp profile across a plurality of radially extending regions of the disk surface 36, such as along an inner diameter region, middle diameter region, and an outer diameter region, or along any other defined radially extending regions (e.g., grouping of tracks) on the disk surface 36. Because the disk warping can be greatest along an inner diameter region, the disk warp characterization unit 344 may determine the warp profile at a higher fidelity, by recording values indicating the change in VGAS for substantially more wedges and/or for substantially more tracks within a wedge, along an inner diameter region than along a middle diameter region, and may determine the warp profile with less fidelity, by recording less values indicating the change in VGAS for substantially less wedges and/or for substantially less tracks within a wedge, along the outer diameter region then along the middle diameter region.

Moreover, the disk warp characterization unit 344 may generate a first set of disk warp characterization values for a first side of the disk surface 36, and then generate disk warp characterizations for an opposite second side of the disk surface 36 using the first set of disk warp characterization values and a relational assumption that the disk warping on the first side is symmetrical and opposite to the disk warping on the second side.

The heater to VGAS response characterization unit 346 varies the power that is applied to the heater element 310 through a range of values while measuring the change in VGAS to determine therefrom the response of the VGAS to variation in the heater element power for at least some wedges, and may determine for all wedges, of the disk surface 36. The generation unit 348 generates values for the disk warp compensated heater value table based on the determined warp profile determined and based on the determined response of VGAS to variation in the power supplied to the heater element 310. Again, because the disk warping can be greatest along an inner diameter region, the disk warp characterization unit 344 may generate values for substantially more wedges and/or for substantially more tracks within a wedge along an inner diameter region of the disk surface 36 than for a middle diameter region, and may generate values for substantially less wedges and/or for substantially less tracks within a wedge along the outer diameter region then for along the middle diameter region.

The fly height controller circuit 350 includes a heater controller circuit 352 and a disk warp compensated heater value table 354 that contains the values generated by the generation unit 348. The table 354 contains heater values to have been adjusted to compensate for the warp profile of the disk surface 36, as determined by the characterization unit 344, and further adjusted to compensate for the response of the VGAS to variation in the heater element power, as determined by the characterization unit 346. The heater values are defined for at least some radial zones within at least some of the wedges of the disk surface 36, and may be defined for all radial zones within all wedges of the disk surface 36. For example, the heater values may be defined for 16 radial zones across the disk, where within each radial zone one or more heater values are defined to compensate for disk warping that is measured based on VGAS variation along one track with that radial zone.

The heater control circuit 352 regulates the power that is applied to the heater element 310 in response to the values in the table 354 and the present wedge and radial location of the head 20. To compensate for response delay time between changes in the heater element power and resulting changes in head fly height, the heater controller circuit 352 may retrieve values from the table 354 that are associated with the head location that is at least one wedge ahead of a present wedge location of the head 20. For example, the heater controller circuit 352 may retrieve values from the table 354 that are associated with a wedge that is four wedges ahead of a present wedge location of the head. Alternatively or additionally, to compensate for the response delay time between changes in the heater element power and resulting changes in head fly height, at least some of the values in the table 354 can be associated with offset wedge locations, such as being associated with a wedges that are offset a defined number of wedges ahead of wedges for which the data was generated by the generation unit 348. The response delay time and associated number of wedges ahead may be looked-ahead can depend upon, for example, the rotational speed of the disk surface 36, the operational power range of the heater element 310, and the thermal-mechanical structure of the head 20.

Figure 4:
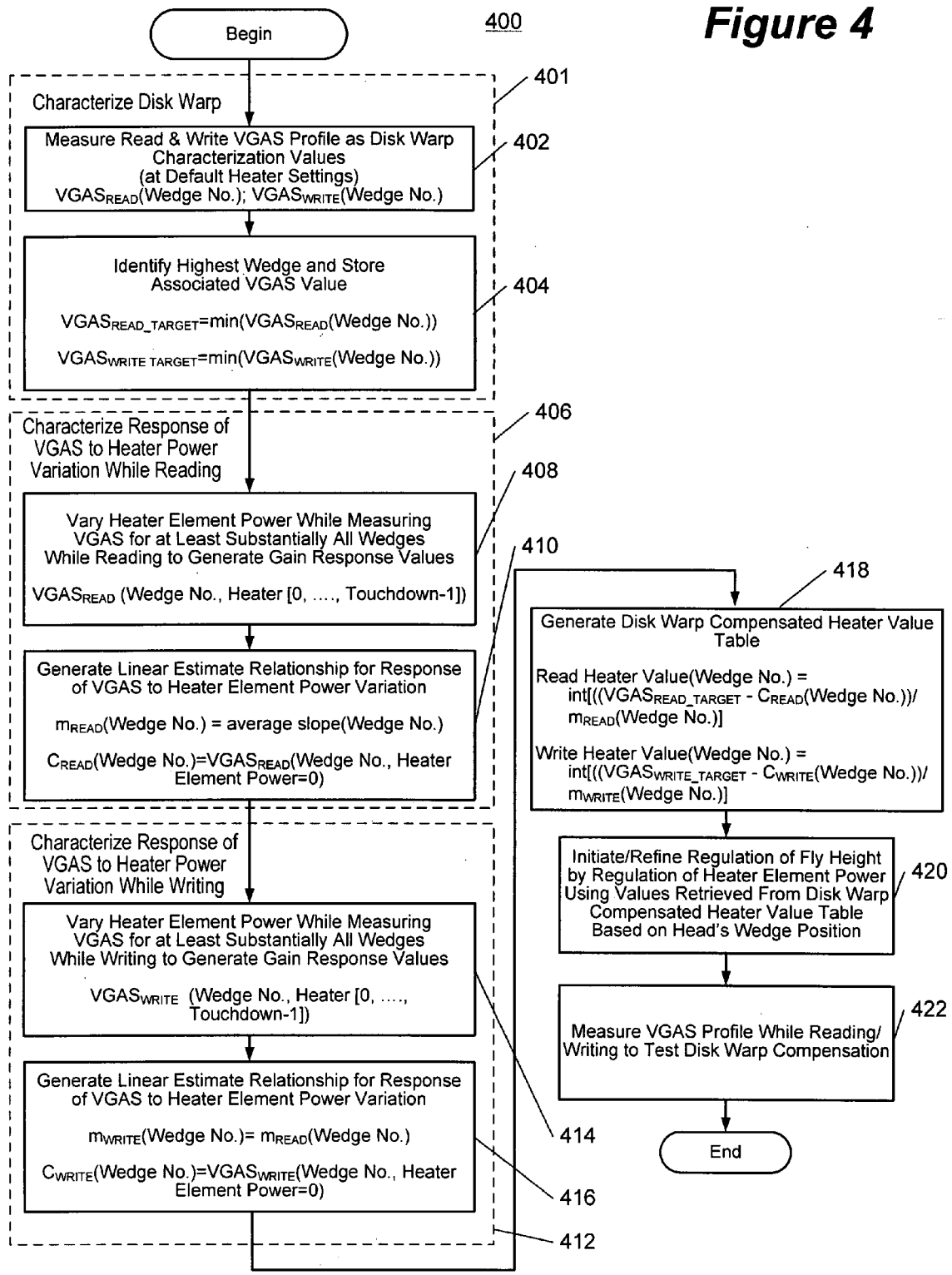
FIG. 4 is a flowchart of operations and methods that regulate head fly height in response to variation in gain of a variable gain amplifier to compensate for warping of a disk surface in accordance with some embodiments.

FIG. 4 is a flowchart of operations and methods 400 that regulate head fly height in response to the VGAS to compensate for warping of the disk surface 36 in accordance with some embodiments. Referring to FIG. 4, operations are carried out in block 401, such as by the disk warp characterization unit 344, to characterize the warped profile of the disk surface 36. For example, the profile of the warped disk surface 36 can be determined by measuring the VGAS as the automatic gain control loop adjusts the magnitude of the read signal as the head 20 reads a gain control pattern in a plurality of sequential servo wedges, and may be carried out with the heater element 310 supplied with the default power level. Separate VGAS values can be determined at block 402 when the head is reading to generate VGAS read related values for the different servo wedges (i.e., $VGAS_{READ}$(Wedge No.)), and when the head is writing to generate VGAS write related values for the different servo wedges (i.e., $VGAS_{WRITE}$ (Wedge No.)).

Figure 7:
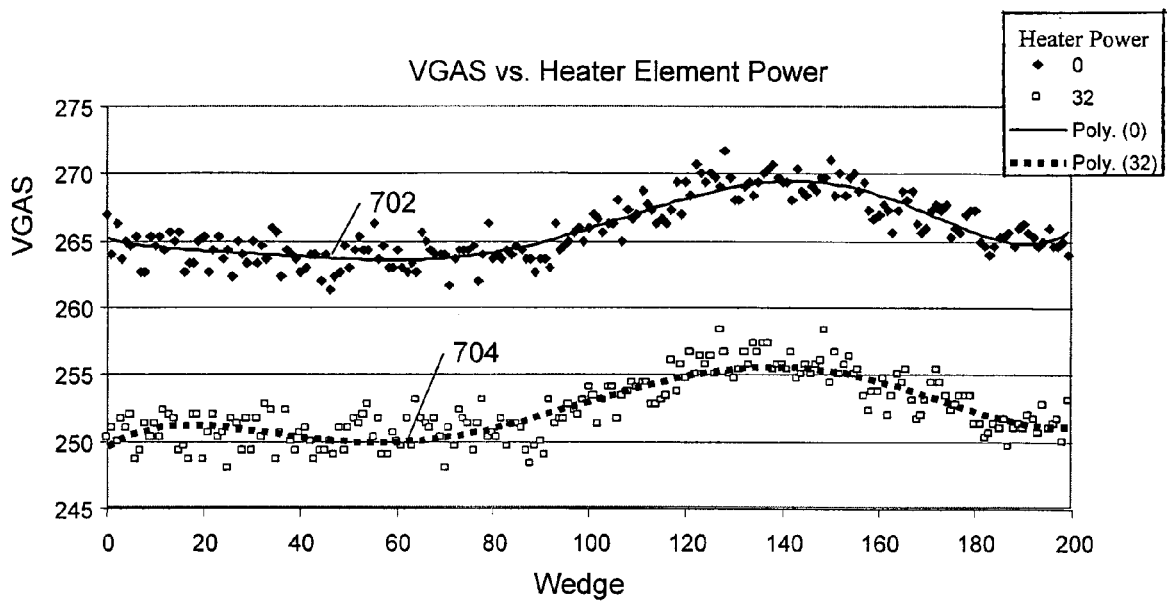
FIG. 7 shows graphs illustrating for each wedge the response of the gain of the variable gain amplifier to variation in heater element power in accordance with some embodiments.

FIG. 7 shows graphs that illustrate for each wedge the response of the gain of the variable gain amplifier 322 to variation in heater element power in accordance with some embodiments. Referring to FIG. 7, it is observed that the magnitude of the sampled VGAS values oscillates across the wedges in a substantially sinusoidal manner corresponding to the warped disk surface 36. The curve 702 corresponds to an average of the measured VGAS values with a heater element power level of zero, and the curve 704 corresponds to an average of the measured VGAS values with a heater element power level of 32. Accordingly, the profile of the warped disk surface 36 can be measured based on the variation in the sampled VGAS values Across a plurality of wedges and across the plurality of radial zones on the disk surface 36.

In block 404, the VGAS values are analyzed to identify the wedge having the highest warp magnitude, which corresponds to the wedge with the minimum VGAS value. The wedge having the highest warp magnitude is one that has the lowest VGAS value because the corresponding minimum relative head fly height provides the strongest relative signal amplitude and thus the lowest relative VGAS value. The VGAS values for reading and writing in the most warped wedge can be defined as target VGAS values, such as provided by the equations below:

$VGAS_{READ\_TARGET}$=min($VGAS_{READ}$(Wedge No.))
and $VGAS_{WRITE\_TARGET}$=min($VGAS_{WRITE}$(Wedge No.)).

The wedge having the highest warp magnitude may also correspond to where contact between the head 20 and the disk surface 36 is initially detected, and may therefore also be used to define the default power level of the heater element 310 based on the heater element power level that resulted in the head-to-disk contact.

In order to determine how the power that is applied to the heater element 310 should be modified so as compensate for the measured disk warp, the response of the VGAS values to variation in heater element power is measured in block 406, such as by the characterization unit 346 in FIG. 3, while the head reads from the disk surface 36, and, in block 412, while the head 20 writes to the disk surface 36. The VGAS response is determined for each of the plurality of wedges on the disk surface 36, and may be determined for all of the wedges. In particular, in block 408, the heater element power is varied through a range that may extend from a zero power level to a power level that is a threshold amount below a maximum power level that should cause the head 20 to contact the disk surface 36. At each incremental heater power level the VGAS value may be measured and recorded. The resulting measurements of VGAS values can be recorded for each associated heater power level and corresponding wedge number, i.e., $VGAS_{READ}$(Heater[0, ..., TouchDown−1], Wedge No.).

Figure 8:
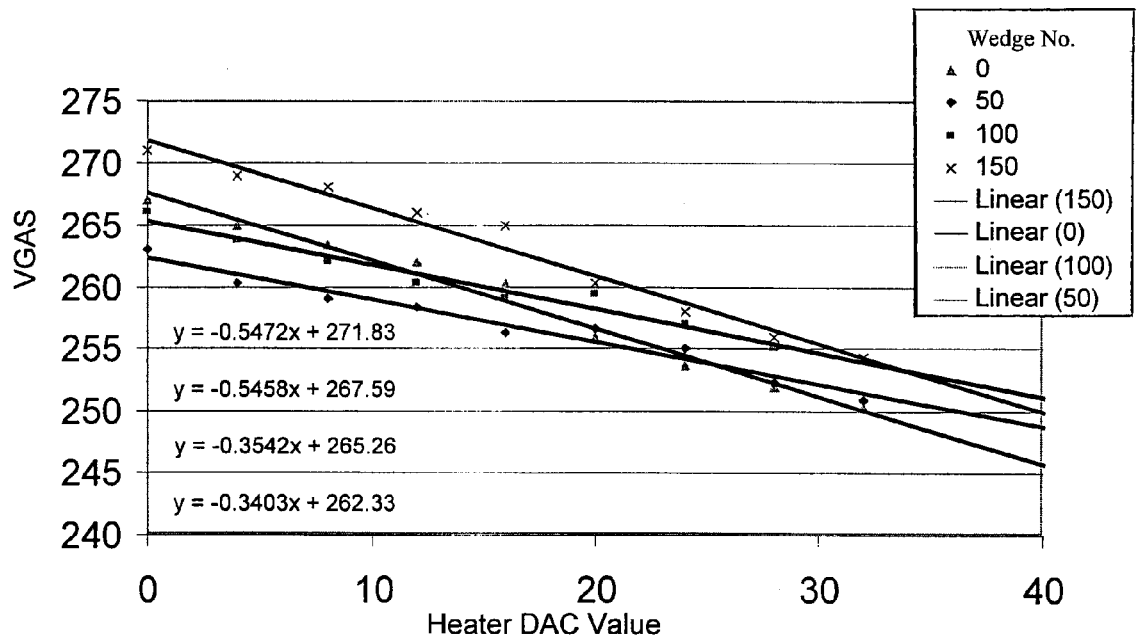
FIG. 8 shows graphs illustrating linear estimate functions for the response of the gain of the variable gain amplifier to variation in heater element power at a plurality of different wedges in accordance with some embodiments.

Referring to FIG. 4, in block 410, a linear relationship may be defined that functionally estimates (approximates) the relationship between the measured VGAS values and the associated heater power levels. Accordingly, each wedge may have a linear estimate function that is defined to relate the measured VGAS values and the heater power levels. The linear estimate function of the VGAS response to heater power profile can be computed for each wedge (i) by generating a set of parameters for the slope (e.g., $m_{WRITE}$ when writing, $m_{READ}$ when reading) and an axis intercept point ($C_{WRITE}$ when writing, $C_{READ}$ when reading). FIG. 8 shows graphs that illustrate various exemplary linear estimate functions for the response of the VGAS values to variation in heater element power levels (i.e., heater element digital-to-analog converter (DAC) register values) for wedge numbers 0, 50, 100, and 150. The slope values (m) and axis intercept (c) values for the linear estimate functions can be determined for each of the wedges (i) by summing and averaging the measured heater element power values (heaterDAC) and associated VGAS values based on the following equations:

$$m[i] = \frac{\sum xy \sum x \sum y}{\sum x^2 - (\sum x)^2}$$

$$c[i] = \frac{\sum y \sum x^2 - \sum x \sum xy}{\sum x^2 - (\sum x)^2}$$

Where:
x=heaterDAC
y=$VGAS_{AVG}$
i=wedge 0, 1, ..., N

The slope parameter does not vary significantly between write operations and read operations. Accordingly, the process for determining the linear estimate functions may be simplified, and corresponding reduction in memory utilization may be achieved, by using a shared slope parameter for both read and write operations. Accordingly, the slope for reading and writing operations for a particular wedge (i) can be defined as follows:

$m[i]=m_{write}[i]=m_{read}[i]$

Similarly, the intercept parameter for particular wedge (c[i]) is observed to correspond closely to the sampled VGAS value when the heater element is supplied with zero power (heater DAC=0). Accordingly, further computational reduction in carrying out the process can be obtained by using the VGAS values at zero heater power, as follows:

$c_{read}[i]=VGAS_{read\_zeroDAC}[i]$ $c_{write}[i]=$
$VGAS_{write\_zeroDAC}[i]$ The characterization unit 346 can further characterize in block 412 the response of the VGAS values to change in the heater element power while the head 20 is writing data onto the disk surface 36. In particular, in block 414, the heater element power is varied through a range such as explained above with regard to block 408 and the corresponding VGAS values are measured and recorded. In block 416, a linear relationship is defined that functionally estimates (approximates) the relationship between the measured VGAS values and the associated heater power levels such as by the operations described above with regard to block 410.

Because write operations result in a heat contribution to the head 20 which is addition to heating by the heater element 310, such writing induced heating can be approximated as a constant that is added to the total output heater power. Accordingly, the response of the VGAS values to changes in heater element power for read operations and for write operations can be related to one another as a relatively constant offset between VGAS response values. Thus, the process for determining the VGAS response values for when the head 20 is reading and when the head 20 is writing can be substantially simplified by determining the VGAS response values for reading and then shifting those determined VGAS response values (increasing the axis intercept point) to determine the VGAS values for writing. The slope of the VGAS response values for writing can set equal to determined slope of the VGAS response values for reading, as described above for block 416. The axis intercept for writing can be determined based on the operations described above for block 414 using $VGAS_{WRITE}$(Wedge No., Heater Element Power=0).

Having determined the slope and axis intercept parameters for the linear estimate functions of the VGAS response, heater values can now be generated that are adjusted (compensated) for the measured disk warp to maintain head fly height within an acceptable range as the head 20 experiences varying disk heights due to warping. In block 418, the compensated heater values are generated for use in a disk warp compensated heater value table. In particular, the compensated read heater value and the compensated write heater value for each of the wedges can be determined based on the following equations:

Read Heater Value(Wedge No.)=
  int[($VGAS_{READ\_TARGET}$−
  $C_{READ}$(Wedge No.))/$m_{READ}$(Wedge No.)]; and Write Heater Value(Wedge No.)=
  int[($VGAS_{WRITE\_TARGET}$−
  $C_{READ}$(Wedge No.))/$m_{WRITE}$(Wedge No.)], for wedge numbers 0, 1, . . . , N.

Because the disk warping can be greatest along an inner diameter region, the operations at block 418 may be carried out to generate substantially more disk warp compensated heater values for substantially more wedges and/or for substantially more tracks within a wedge along an inner diameter region than for along a middle diameter region, and may generate less disk warp compensated heater values for substantially less wedges and/or for substantially less tracks within a wedge along the outer diameter region then along the middle diameter region.

Figure 9:
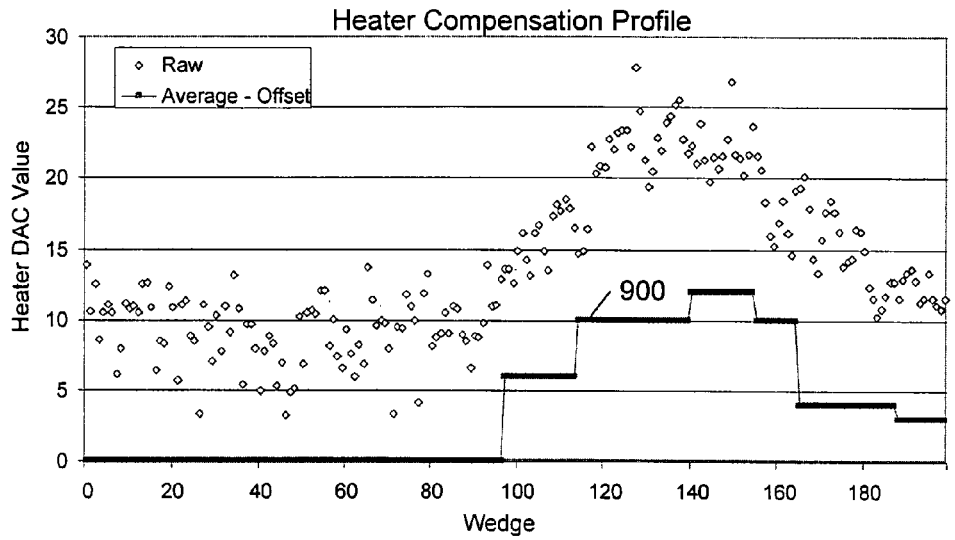
FIG. 9 shows graphs illustrating heater element values that may form part of a disk warp compensated heater value table to compensate for disk warp across a plurality of wedges in accordance with some embodiments.

FIG. 9 shows graphs that illustrate exemplary heater element values that have been calculated to compensate for disk warp across a plurality of wedges in accordance with some embodiments. The scattered raw heater element values may be averaged within wedges, as shown by graph 900 in FIG. 9, to reduce noise, and a constant offset therein may be removed to facilitate use of the compensated heater values and controlling power supply to the heater element 310 as the head 20 moves across the wedges. The compensated heater values (graph 900) are programmed into the disk warp compensated heater value table 354 in FIG. 3.

As explained above, the heater controller circuit 352 regulates the power that is applied to the heater element 310 in response to the values in the disk warp compensated heater value table 354 and responsive to the present wedge and radial location of the head 20.

Figure 10:
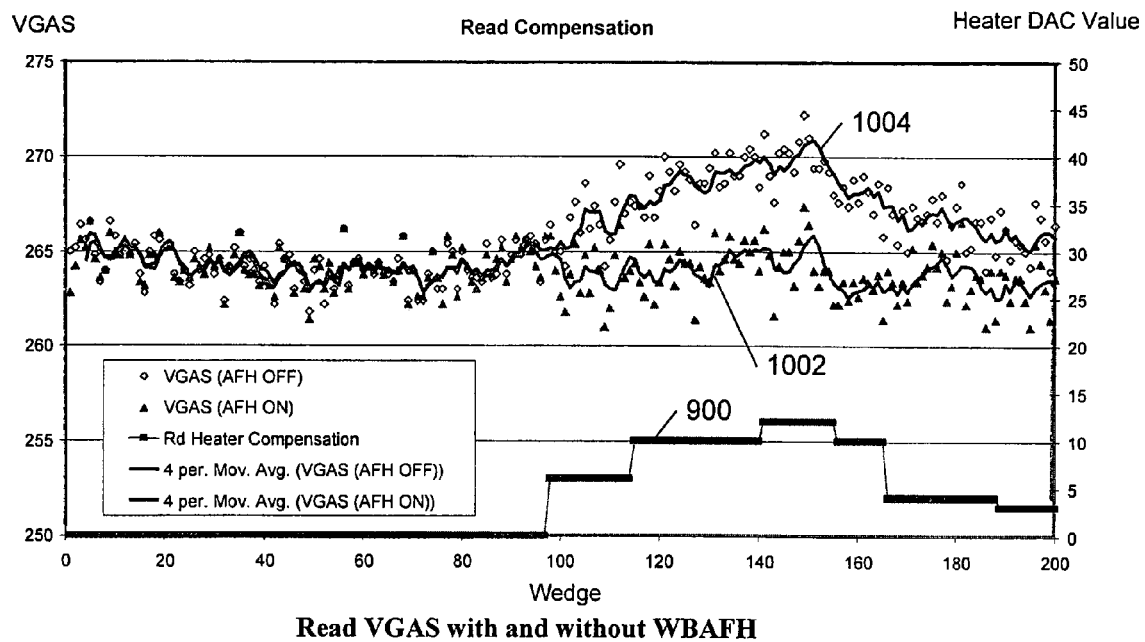
FIG. 10 shows two graphs, one of which illustrates the variation in gain of the variable gain amplifier while the head is reading and the heater element power is regulated to compensate for disk warp across a plurality of wedges, and the other of which illustrates the variation in gain of a variable gain amplifier while the head is reading and the heater element power is not regulated to compensate for disk warp across the plurality of wedges.

FIG. 10 shows two graphs, one of which (graph 1002) illustrates the variation in gain of the variable gain amplifier while the head 20 is reading and the heater element power is regulated, based on the disk warp compensated heater element values (graph 900) in table 354, to compensate for disk warp across a plurality of wedges. The other graph (1004) illustrates the variation in gain of the variable gain amplifier 322 while the head 20 is reading and the heater element power is not regulated to compensate for disk warp across the plurality of wedges.

Figure 11:
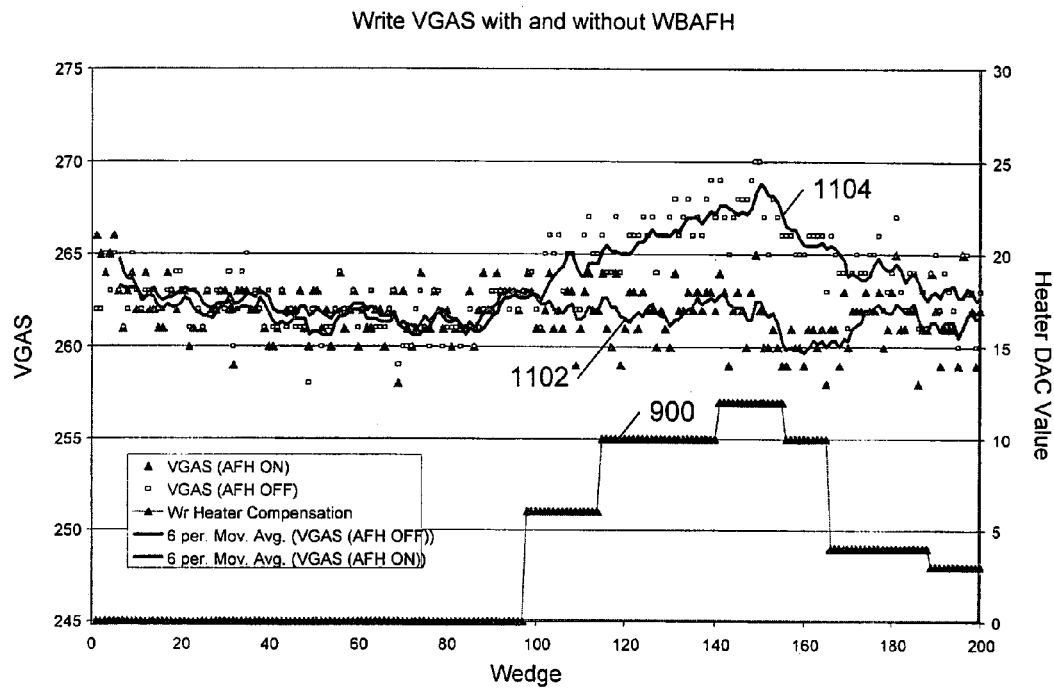
FIG. 11 shows two graphs, one of which illustrates the variation in gain of the variable gain amplifier while the head is writing and the heater element power is regulated to compensate for disk warp across a plurality of wedges, and the other of which illustrates the variation in gain of a variable gain amplifier while the head is writing and the heater element power is not regulated to compensate for disk warp across the plurality of wedges.

FIG. 11 shows two graphs, one of which (graph 1102) illustrates the variation in gain of the variable gain amplifier while the head 20 is writing and the heater element power is regulated, based on the disk warp compensated heater element values (graph 900) in table 354, to compensate for disk warp across a plurality of wedges. The other graph (1104) illustrates the variation in gain of the variable gain amplifier 322 while the head 20 is writing and the heater element power is not regulated to compensate for disk warp across the plurality of wedges. It is noted that in FIGS. 10 and 11, that the profile of the VGAS is flatter when the heater element power is regulated, based on the disk warp compensated heater element values (graph 900) in table 354, to compensate for disk warp across a plurality of wedges. Accordingly, the automatic gain control loop (e.g., variable gain amplifier 322, low pass filter 324, and automatic gain control circuit 328) may generate amplified and filtered read signal values for use by the read signal processing circuit 326 that have a higher signal-to-noise ratio that may otherwise be obtained as the head 20 reads from warped areas of the disk surface 36.

Figure 5:
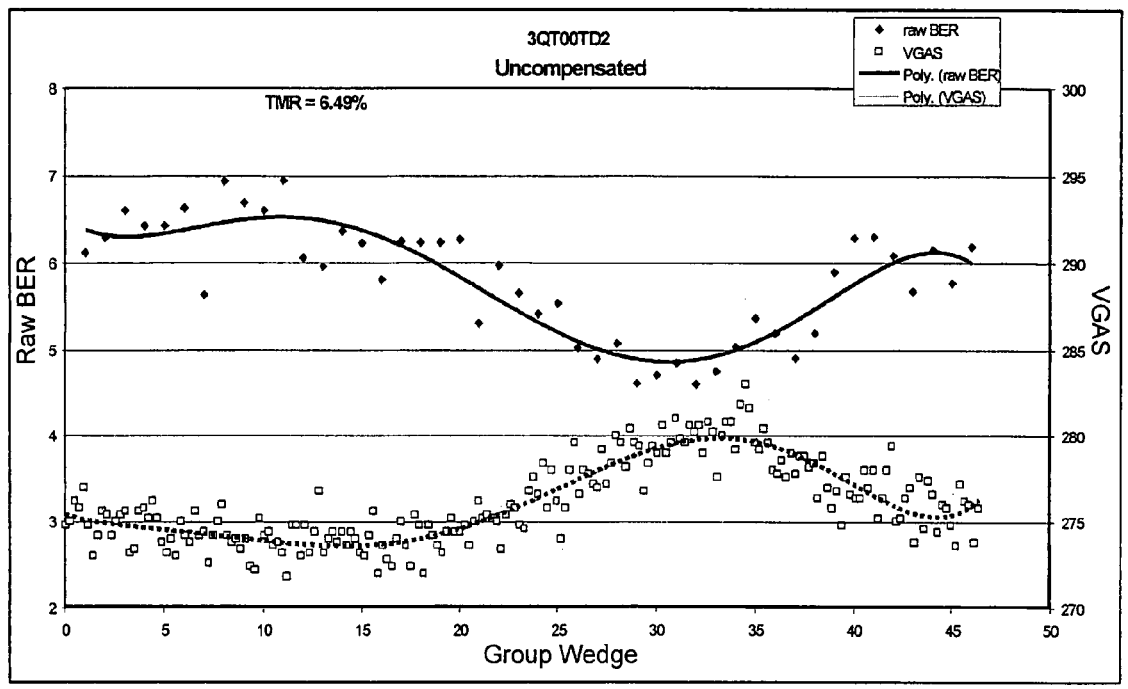
FIG. 5 shows graphs illustrating variation in gain of a variable gain amplifier (VGAS), within an automatic gain control loop, amplifying a read signal and illustrating variation in bit error rate (BER) across wedges on a disk.
Figure 6:
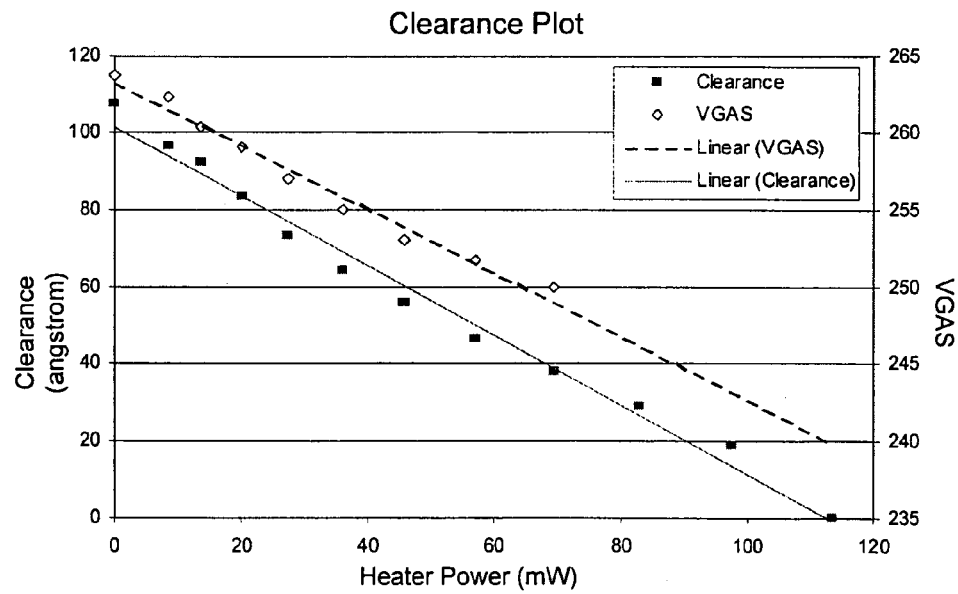
FIG. 6 shows graphs illustrating the response of the gain of the variable gain amplifier to variation in power supplied to a heater element for heating the head and the response of the head fly height to variation in heater element power in accordance with some embodiments.
Figure 12:
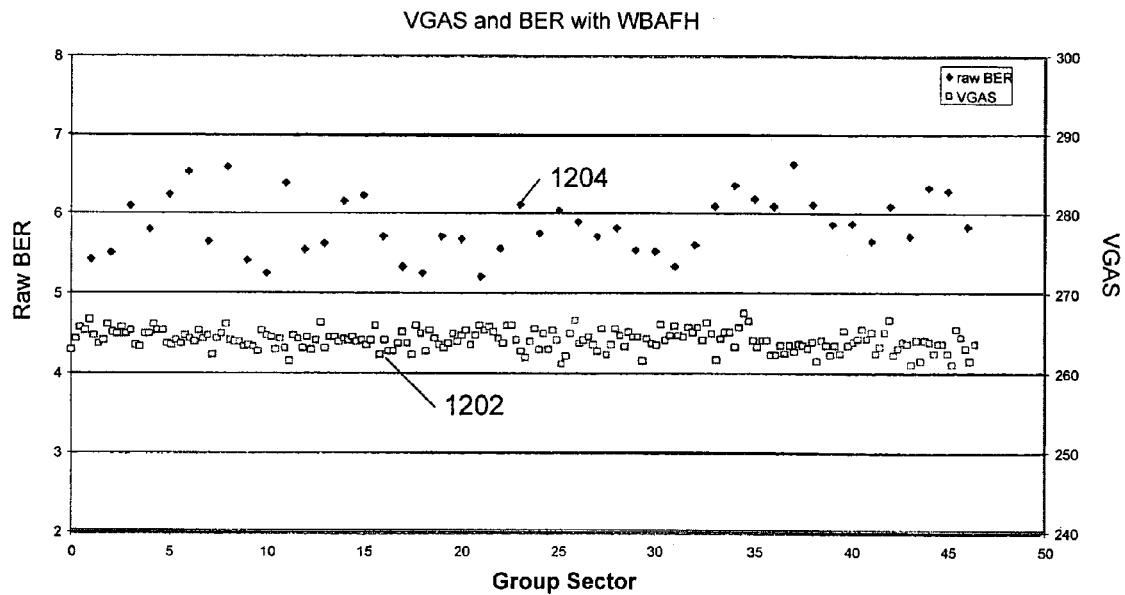
FIG. 12 shows two graphs, one of which illustrates the variation in gain of the variable gain amplifier while the heater element power is regulated to compensate for disk warp across a plurality of wedges, and the other of which illustrates the BER while the heater element power is regulated to compensate for disk warp across the plurality of wedges.

FIG. 12 shows two graphs, one of which (scatter graph 1202) illustrates the variation in gain of the variable gain amplifier 328 while the heater element power is regulated to compensate for disk warp across a plurality of wedges. The other graph (1204) illustrates the bit error rate (BER) while the heater element power is regulated to compensate for disk warp across the plurality of wedges. Accordingly, FIG. 12 illustrates that use of the disk warp compensated heater element values may flatten the VGAS and provide a lower, more consistent, BER as the head 20 reads from warped areas of the disk surface 36. For example, the relatively poor BER that occurs in FIG. 5 between wedges 80 to 180 when head fly height is not regulated has been substantially improved with disk warp compensation as shown in the corresponding wedges 80 to 180 in FIG. 12. Accordingly, using disk warp compensated heater element values to regulate power supply to the heater element 310 while the head 20 moves across the warped disk surface 36 may improve the signal-to-noise ratio of the read signal and correspondingly improve the BER in data read from the disk 12.

Referring back to FIG. 4, the VGAS profile may be determined while reading/writing and compared to one or more threshold values to determine whether the present heater values sufficiently compensate for the disk surface warping, and, if not, the operations of blocks 401-420 may be repeated to further adjust the heater values until the resulting VGAS profile is acceptable.

In the drawings and specification, there have been disclosed typical preferred embodiments and, although specific terms are employed, they are used in a generic and descriptive sense only and not for purposes of limitation, the scope being set forth in the following claims.

What is claimed is:

1. An apparatus comprising:
a circuit that detects variation in height of a disk surface relative to a head in response to variation in gain of a variable gain amplifier, within an automatic gain control loop, amplifying a read signal as the head reads from the disk surface, and regulates head fly height to compensate for the detected variation in disk height.

2. The apparatus of claim 1, wherein the circuit generates disk height characterization values in response to variation in gain of the variable gain amplifier as the head reads from a plurality of different wedges and different tracks on the disk surface, and regulates head fly height in response to the disk height characterization values.

3. The apparatus of claim 2, wherein the circuit generates disk height characterization values for more radial track locations along an inner diameter region of the disk surface than for an outer diameter region of the disk surface.

4. The apparatus of claim 2, wherein the circuit generates disk height characterization values for more wedges along an inner diameter region of the disk surface than for an outer diameter region of the disk surface.

5. The apparatus of claim 2, wherein the circuit generates a first set of disk height characterization values for a first disk surface and generates a second set of disk height characterization values for an opposite second disk surface using the first set of disk height characterization values and a relational assumption of symmetrical and opposite warping of the first and second disk surfaces.

6. The apparatus of claim 2, wherein the circuit generates gain response values that are indicative of response of the gain of the variable gain amplifier to variation in power supplied to a heater element for heating the head, and regulates head fly height by regulating power supplied to the heater element in response to the disk height characterization values and the gain response values associated with locations of the head.

7. The apparatus of claim 6, wherein the circuit generates a first group of gain response values while the head is reading data and a second group of gain response values while the head is writing data, regulates heater element power while reading data using the disk height characterization values and the first group of gain response values, and regulates heater element power while writing data using the disk height characterization values and the second group of gain response values.

8. The apparatus of claim 6, wherein the circuit uses the disk height characterization values and the gain response values to generate a disk height compensated heater value table that identifies changes in heater element power at corresponding wedge and radial locations on the disk, and regulates head fly height in response at least one value from the disk height compensated heater value table that is identified responsive to a location of the head.

9. The apparatus of claim 8, wherein the circuit generates more values in the disk height compensated heater value table for more radial track locations along an inner diameter region of the disk surface than for an outer diameter region of the disk surface.

10. The apparatus of claim 9, wherein the circuit generates more values in the disk height compensated heater value table for more wedges along an inner diameter region of the disk surface than for an outer diameter region of the disk surface.

11. The apparatus of claim 8, wherein the circuit compensates for a response delay time between changes in the heater element power and resulting changes in head fly height by retrieving values from the disk height compensated heater value table that are associated with a head location that is ahead of a present wedge location of the head.

12. The apparatus of claim 8, wherein at least some values of the disk height compensated heater value table are associated with offset locations on the disk to compensated for a response delay time between changes in the heater element power and resulting changes in head fly height.

13. The apparatus of claim 6, wherein the circuit generates the gain response values by repetitively varying power supplied to the heater element in a range between zero and a threshold power level above a touchdown power level causing the head to touch the disk surface, and measuring the corresponding change in the gain of the variable gain amplifier for each of a plurality of wedges on the disk surface.

14. The apparatus of claim 6, wherein the circuit generates the gain response values by repetitively varying power supplied to the heater element and measuring the corresponding change in the gain of the variable gain amplifier for each of a plurality of wedges on the disk surface, generates from the gain response values a linear estimate of the response of the gain of the variable gain amplifier to variation in heater element power, and generates the gain response values for the plurality of wedges in response to the linear estimate.

15. An apparatus comprising:
a circuit that generates disk height compensated heater element values based on variation in gain of a variable gain amplifier within an automatic gain control loop that amplifies a read signal as a head reads from a plurality of wedges on a disk surface, and that regulates head fly height using the disk height compensated heater element values to regulate heating of a heater element to compensate for variations in height of a disk surface.

16. The apparatus of claim 15, wherein the disk height compensated heater element values used by the circuit to regulate head fly height are further generated based on response of the gain of the variable gain amplifier to variation in power supply to the heater element for heating the head.

17. A method comprising:
using a variable gain amplifier within an automatic gain control loop to amplify a read signal as a head reads from a surface of a disk;
detecting variation in height of the disk surface relative to the head in response to variation in gain of the variable gain amplifier; and
regulating head fly height to compensate for the detected variation in disk surface height.

18. The method of claim 17, further comprising generating gain response values that are indicative of response of the gain of the variable gain amplifier to variation in power supplied to a heater element for heating the head, wherein the head fly height is regulated by regulating heater element power in response to the detected variation in disk surface height and the generated gain response values.

19. The method of claim 17, wherein head fly height is regulated in response to disk height compensated heater element values that are selected based on head location and which are used to regulate heating of a heater element for heating the head.

* * * * *

UNITED STATES PATENT AND TRADEMARK OFFICE
CERTIFICATE OF CORRECTION

PATENT NO. : 7,508,617 B1  Page 1 of 1
APPLICATION NO. : 11/851534
DATED : March 24, 2009
INVENTOR(S) : Mak et al.

It is certified that error appears in the above-identified patent and that said Letters Patent is hereby corrected as shown below:

On Title Page:
Add item (65), to Prior Publication Data:
-- US 2009/0067095 A1   Mar. 12, 2009 --

Signed and Sealed this

Thirteenth Day of July, 2010

David J. Kappos
*Director of the United States Patent and Trademark Office*